United States Patent
Wu

(10) Patent No.: US 8,796,992 B2
(45) Date of Patent: Aug. 5, 2014

(54) BASIC UNIT OF LITHIUM-ION BATTERY, BATTERY PACK COMPRISING THE SAME, AND CHARGE/DISCHARGE EQUALIZING METHOD THEREOF

(76) Inventor: Yuebin Wu, Shenzhen (CN)

( * ) Notice: Subject to any disclaimer, the term of this patent is extended or adjusted under 35 U.S.C. 154(b) by 322 days.

(21) Appl. No.: 13/312,987

(22) Filed: Dec. 6, 2011

(65) Prior Publication Data
US 2012/0268057 A1    Oct. 25, 2012

(30) Foreign Application Priority Data
Apr. 19, 2011   (CN) .......................... 2011 1 0098056

(51) Int. Cl.
*H02J 7/00*         (2006.01)
*H01M 10/44*        (2006.01)
*H01M 10/0525*      (2010.01)

(52) U.S. Cl.
CPC ............. *H01M 10/44* (2013.01); *H02J 7/0018* (2013.01); *Y02E 60/12* (2013.01); *H01M 10/0525* (2013.01); *Y02B 40/90* (2013.01); *H02J 7/0026* (2013.01)
USPC .......................................... 320/118; 320/117

(58) Field of Classification Search
USPC ................................................. 320/117–118
See application file for complete search history.

(56) References Cited

U.S. PATENT DOCUMENTS

| | | | |
|---|---|---|---|
| 2005/0017682 A1* | 1/2005 | Canter et al. | 320/118 |
| 2010/0194339 A1* | 8/2010 | Yang et al. | 320/116 |
| 2010/0327807 A1* | 12/2010 | Kikinis et al. | 320/116 |
| 2011/0025125 A1* | 2/2011 | Brabec | 307/9.1 |

\* cited by examiner

*Primary Examiner* — Samuel Berhanu
(74) *Attorney, Agent, or Firm* — SV Patent Service

(57) ABSTRACT

A basic unit of lithium-ion battery, including: at least two series-connected lithium-ion cells; at least one lithium-ion cell for balance; controllable switches with the same number as the lithium-ion cells; a drive module for the controllable switches; a voltage detection module for detecting a voltage at two ends of the lithium-ion cells; and a controller. The lithium-ion cell for balance is connected in parallel to the lithium-ion cells. The controllable switches control the turn on/off of the connection in parallel between the lithium-ion cell for balance and each of the lithium-ion cells independently. The drive module for the controllable switches and the voltage detection module are connected to the controller. A battery pack including the basic unit of lithium-ion battery and a method for real-time charge/discharge equalizing of the basic unit of lithium-ion battery are also provided.

10 Claims, 9 Drawing Sheets

BASIC UNIT OF LITHIUM-ION BATTERY, BATTERY PACK COMPRISING THE SAME, AND CHARGE/DISCHARGE EQUALIZING METHOD THEREOF

CROSS-REFERENCE TO RELATED APPLICATIONS

Pursuant to 35 U.S.C. §119 and the Paris Convention Treaty, this application claims the benefit of Chinese Patent Application No. 201110098056.1 filed Apr. 19, 2011, the contents of which are incorporated herein by reference.

BACKGROUND OF THE INVENTION

1. Field of the Invention

The invention relates to a lithium-ion battery, and more particularly to a basic unit of lithium-ion battery, a battery pack comprising the same, and a charge/discharge equalizing method thereof.

2. Description of the Related Art

Conventionally, a lithium-ion cell cannot have exactly the same voltage, current, and charge/discharge time as another lithium-ion cell, even if they have the same specifications (e.g., single stage) under production, charge/discharge process, and different application environments. Such nonuniformity in a battery pack composed of multiple lithium-ion cells shortens its charge/discharge time, with some lithium-ion cells failing to fully charge or output electrical energy. Thus, the battery pack will suffer from a low efficiency and a shortened lifespan. For example, an individual lithium-ion cell can be recharged 2000 times, but a battery pack composed of 12 lithium-ion cells can only be recharged 400 times. This is a fundamental reason why the capacity and the lifespan of a lithium-ion battery pack cannot be increased by increasing the number of the lithium-ion cells.

To solve the above problems, the following two types of charge equalizing methods are applied to lithium-ion batteries:

1. Equalizing Charge Method of Energy Consumption Type

While charging, excess electrical energy of a lithium-ion cell is consumed by using a shunt resistor connected in parallel.

However, such a method can only achieve a one-way equalizing while charging, but not during the discharge. It is also consumes energy and produces a large amount of heat. If the ventilation is insufficient, it may cause a lithium-ion battery to explode due to high temperatures and internal resistance.

Such a method cannot equalize high currents. For example, to prevent the heat of a resistor from affecting a lithium-ion battery, a 100 mA current is often selected to equalize, but the equalizing effect is unnoticeable, the equalizing control is complicated, and thus the lithium-ion cells cannot be packed together. Therefore, the equalizing charge method of energy consumption type is only used in fields with no safety requirements, as in airplane models, whose capacity is limited to a three-stage series-connected battery pack.

2. Equalizing Charge Method of Non-energy Consumption Type

Two ends of a lithium-ion cell are connected to two corresponding ends of an inductance (or capacitance), which is used as an energy transfer carrier. When a lithium-ion cell has redundant energy, a switch is turned on to connect and transfer the redundant energy to the inductance (or capacitance) and from there to a corresponding inductance (or capacitance) of a low-energy lithium-ion cell. Charge equalizing of the lithium-ion battery is achieved after the energy stored in the inductance (or capacitance) is transferred to the low-charge lithium-ion cell.

However, this method has the same disadvantages as one-way equalizing during the charge rather than during the discharge, and the control system is complicated. Since energy is consumed through transfers and large-sized inductances or capacitances occupy a large amount of space, high currents cannot be equalized, and thus battery packs with large capacity and high output current/voltage cannot be built.

In practical applications, lithium-ion battery packs without an equalizing device are mainly used in electric bicycles for civilian use and electric tools. The voltage of a lithium-ion battery pack is generally 24-36 V. If the battery pack is for an electric automobile, it must have a capacity (e.g. 480 V, 150 A) of 40-60 kW (equal to a displacement of 1.3-1.6 L).

Under such a capacity, if the limit of the overcharge voltage for an individual lithium-ion cell is 4.2 V and the limit of the overdischarge voltage is 3.0 V, when a battery pack composed of the lithium-ion cells is used for a certain number of charge/discharge cycles, the voltage difference between lithium-ion cells with the best and the worst electrochemical performance can be as high as 3.3-3.8 V (i.e. 0.5 V).

While charging, the worst lithium-ion battery can quickly reach the limit of the overcharge voltage and terminate the charge process; while in the discharge process, the worst lithium-ion battery can quickly reach the limit of the overdischarge voltage and terminate the discharge process.

Consequently, the lithium-ion battery pack has very low charge/discharge efficiency, especially for cases of greater numbers of series-connected battery packs, larger capacities, and longer charge/discharge times. Moreover, the overcharge and overdischarge management of the lithium-ion battery must be ensured, or the lifespan of the lithium-ion battery pack will progressively decrease.

The nonuniformity of lithium-ion cells is determined by their electrochemical properties and is a fundamental reason why multiple lithium-ion cells cannot be packed together.

SUMMARY OF THE INVENTION

In view of the above-described problems, it is one objective of the invention to provide a basic unit of lithium-ion battery.

It is another objective of the invention to provide a battery pack comprising the basic unit of lithium-ion battery.

It is still another objective of the invention to provide a method for real-time charge/discharge equalizing of the basic unit of lithium-ion battery.

To achieve the above objectives, in accordance with one embodiment of the invention, there is provided a basic unit of lithium-ion battery, comprising:
- at least two series-connected lithium-ion cells;
- at least one lithium-ion cell for balance;
- controllable switches with the same number as the lithium-ion cells;
- a drive module for the controllable switches;
- a voltage detection module for detecting a voltage at two ends of the lithium-ion cells; and
- a controller;

wherein the lithium-ion cell for balance is connected in parallel to the lithium-ion cells; the controllable switches control the turn on/off of the connection in parallel between the lithium-ion cell for balance and each of the lithium-ion cells independently; and the drive module for the controllable switches and the voltage detection module are connected to the controller.

In a class of this embodiment, the controllable switches are contactless matrix switches.

In a class of this embodiment, each contactless matrix switch comprises a forward matrix switch connected between the anode of the lithium-ion cell and the anode of lithium-ion cell for balance and a backward matrix switch connected between the cathode of the lithium-ion cell and the cathode of the lithium-ion cell for balance.

In a class of this embodiment, both the forward and the backward matrix switches are two-way switches with double metallic oxide semiconductor field effect transistors (MOSFETs). Each double-MOSFET two-way switch comprises a first and a second MOSFET. A source electrode of the first MOSFET is connected to that of the second MOSFET. A gate electrode of the first MOSFET is connected to that of the second MOSFET and used as a control side to connect the drive module. Drain electrodes of the first and the second MOSFET are used as input and output ends, respectively, for the double-MOSFET two-way switch.

In a class of this embodiment, the basic unit of lithium-ion battery further comprises an overcharge and overdischarge protection switch connected to the lithium-ion cells in series, and a control side of the overcharge and overdischarge protection switch is connected to the drive module.

In a class of this embodiment, the basic unit of lithium-ion battery further comprises a self-recovery fuse for secondary protection connected in series to the lithium-ion cells.

In accordance with another embodiment of the invention, there is provided a battery pack comprising a plurality of basic unit of lithium-ion battery, the basic unit of lithium-ion battery being connected with each other in series or in parallel or both.

In another aspect, the invention provides a method for real-time charge/discharge equalizing of the basic unit of lithium-ion battery, comprising charge equalizing and discharge equalizing, the charge equalizing comprising the following steps:

1-1) Detecting a voltage at two ends of each lithium-ion cell;

1-2) Comparing the voltage at the two ends of each lithium-ion cell;

1-3) Sharing the current of the lithium-ion cell with the highest voltage at its two ends using the lithium-ion cell for balance within a preset time;

The discharge equalizing comprising the following steps:

2-1) Detecting a voltage at two ends of each lithium-ion cell;

2-2) Comparing the voltage at the two ends of each lithium-ion cell;

2-3) Supplementing current to the lithium-ion cell with the lowest voltage at its two ends using the lithium-ion cell for balance within a preset time.

In a class of this embodiment, the charge equalizing further comprises an overcharge protection step: determining whether the voltage of the lithium-ion cell with the highest voltage at its two ends is higher than the preset threshold of the overcharge protection voltage, if so, halting the charging; the discharge equalizing further comprises an overdischarge protection step: determining whether the voltage of the lithium-ion cell with the lowest voltage at its two ends is lower than the preset threshold of the overdischarge protection voltage, if so, halting discharging.

In a class of this embodiment, a drive circuit of the controllable MOSFET matrix switches comprises positive and negative two-way power supplies. These positive and negative power supplies connect, respectively, with a gate electrode of the MOSFET matrix switches via an opto-coupler of their own; the controller turns the control side of the two opto-couplers on or off.

Voltages from the positive and negative two-way power supplies controlled by the two opto-couplers are combined and connected with the gate electrode of the MOSFET matrix switches. If a positive voltage is applied to the gate electrode of the MOSFET matrix switches, the resistance between a drain electrode and a source electrode of the MOSFET matrix switches is low and thus the switch turns on. If a negative voltage is applied to the gate electrode of the MOSFET matrix switch, the resistance between the drain electrode and the source electrode of the MOSFET matrix switches is high and thus the switch turns off. Likewise, if the gate electrode of the MOSFET matrix switch is suspended, the resistance between the drain electrode and the source electrode of the MOSFET matrix switches is high and thus the switch turns off.

The drive circuit comprises a protection diode, and when the controller is being powered on, out of control, or comprises floating input pins, the protection diode locks the opto-couplers to output a negative voltage, thereby ensuring that all the MOSFET matrix switches are turned off to maintain circuit safety.

The protections of the drive circuit for the MOSFET matrix switches of the basic unit of lithium-ion battery comprise the power-on protection of the controller, the out of control protection of the control program, and floating input pin protection of the out-of-control control side.

Advantages of the invention are summarized as follows:
1) Using batteries as the energy carrier for equalizing is safer and more stable and does not consume energy or produce large amounts of heat;
2) Since real-time equalizing is conducted during the charge and discharge processes, compared with conventional one-way charge equalizing using inductance or capacitance as an energy carrier, the invention has a better real-time equalizing effect because it uses a certain amount of time as cycles to continuously balance charge/discharge of every lithium-ion battery. The invention can equalize high currents, improve the accuracy of equalizing and switching speed of matrix switches, and enable the lithium-ion cells within the basic unit of lithium-ion battery to have a uniform charging/discharging voltage, thereby overcoming the technical bottleneck that lithium-ion cells are difficult to be packed in numbers due to the nonuniformity of the electrochemical performance. Consequently, the effective energy usage range of the lithium-ion battery pack has been widened and the charge/discharge efficiency thereof has been improved; and
3) The control system of the invention is simple. In a preferred embodiment, the double-MOSFET two-way switch is used as the control switch. The two-way switch features high speed (level 10 ns), high input impedance, low level drive, excellent anti-breakdown effects, and low resistance between a drain electrode and a source electrode of the MOSFET matrix switches. Furthermore, the invention overcomes the problem that, in the presence of a built-in diode, when the lithium-ion cells are packed (in series) and a MOSFET switch matrix is assembled, uncertain loops or short circuit can occur, damaging the cells of the basic unit, components, and the MOSFET itself. Consequently, the double-MOSFET two-way switch is unlikely to be damaged and has greater stability.

DETAILED DESCRIPTION OF THE EMBODIMENTS

The invention is explained in further detail below with the aid of the attached drawings and preferred embodiments.

For the purpose of the invention, 1) a lithium-ion cell refers to a storage battery of a basic unit of lithium-ion battery; and 2) a lithium-ion cell for balance refers to an energy carrier of charge/discharge equalizing of a basic unit of lithium-ion battery, which can be the same as the lithium-ion cell.

Figure 1:
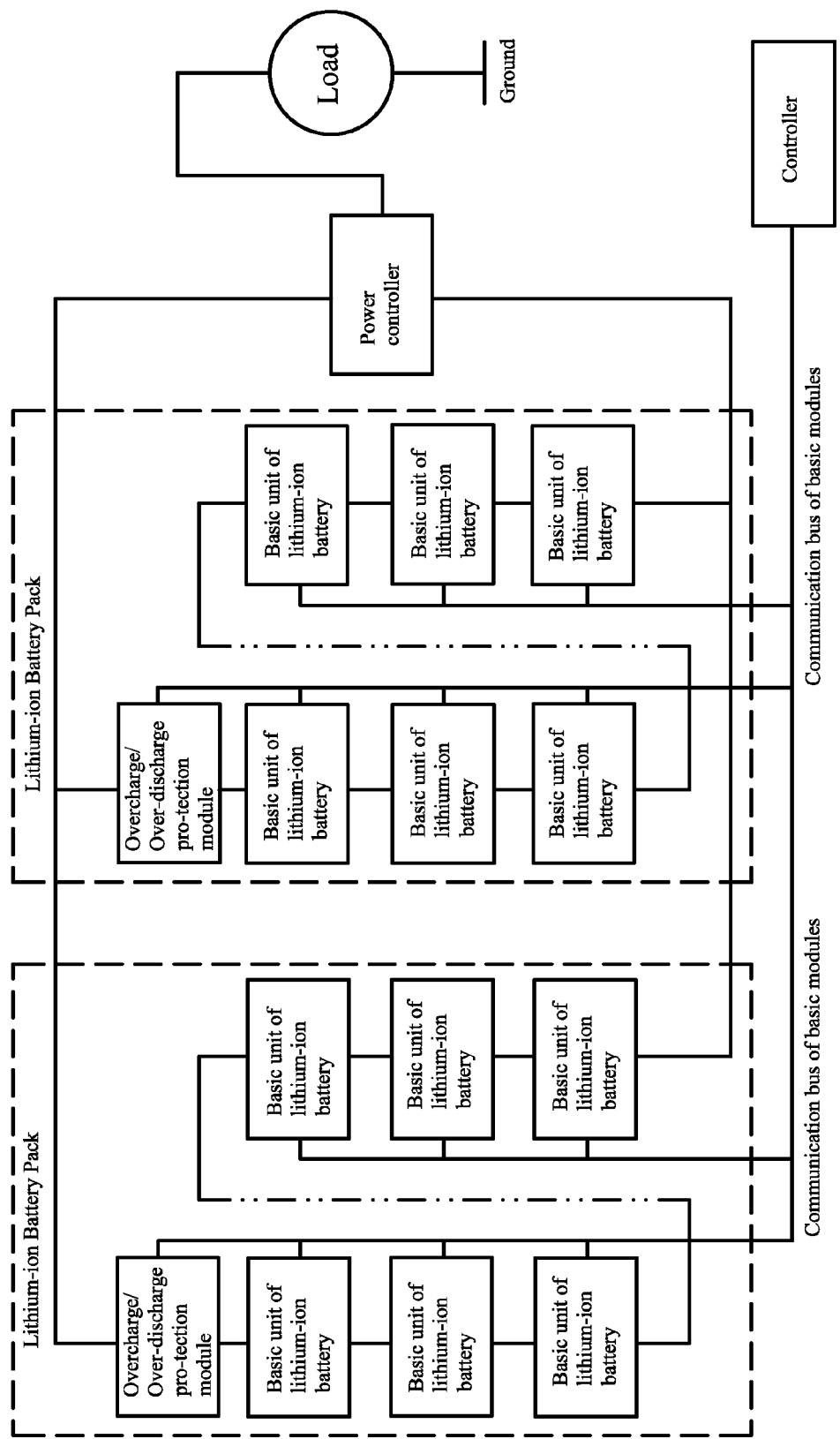
FIG. 1 is a circuit diagram of a battery pack of one embodiment of the invention.

As shown in FIG. 1, a battery pack of one embodiment comprises a plurality of basic units of lithium-ion battery and the rated output voltage and output current of each basic unit of lithium-ion battery is 11.8 V and 2 A, respectively.

Figure 2:
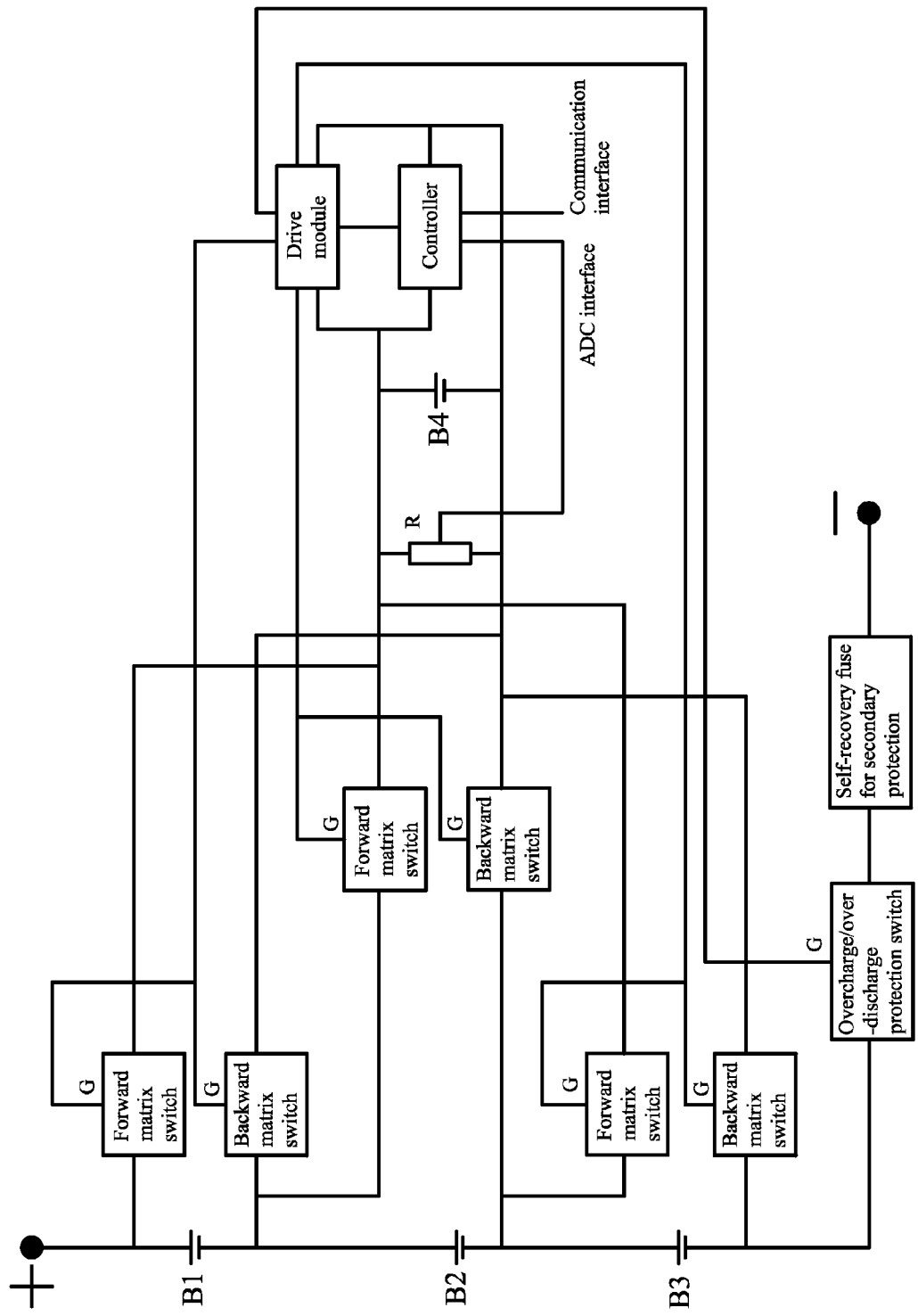
FIG. 2 is a circuit diagram of a basic unit of lithium-ion battery of FIG. 1.

Referring to FIG. 2, a basic unit of lithium-ion battery of the embodiment comprises three lithium-ion cells B1, B2, and B3 connected in series, a lithium-ion cell for balance B4, six contactless matrix switches, a self-recovery fuse for secondary protection, an overcharge/overdischarge protection switch, a voltage detection module (a precise sampling resistor R is used as the voltage detection module in this embodiment), and a drive module and a controller for the six contactless matrix switches.

As shown in FIG. 2, the anode of each lithium-ion cell is connected to that of the lithium-ion cell for balance B4 by a lead wire and a forward matrix switch is connected therebetween, in which the forward matrix switch is to control on and off. The cathode of each lithium-ion cell is connected to that of the lithium-ion cell for balance B4 by another lead wire and a backward matrix switch is connected therebetween, in which the backward matrix switch is to control on and off. A control side of the forward matrix switch and the backward matrix switch connecting the same lithium-ion cell are first connected with each other and then connected to the drive module, i.e. the forward matrix switch and the backward matrix switch connecting to the same lithium-ion cell turn on or off at the same time.

The precise sampling resistor R is connected in parallel to the lithium-ion cell for balance B4 and a control side thereof is connected to the controller. The precise sampling resistor R collects the voltage signal of each lithium-ion cell and then transmits it to the controller.

The overcharge protection switch is connected to the cathode of the lithium-ion cell B3 after it is connected in series to the self-recovery fuse for secondary protection and a control side of the overcharge/overdischarge protection switch is connected to the drive module, which is also connected with the controller.

Figure 3:
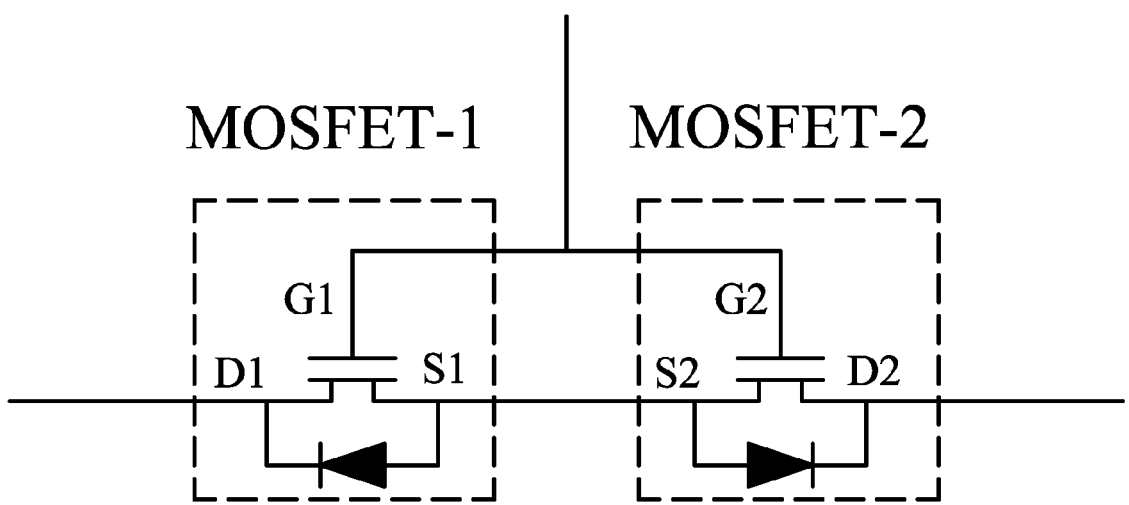
FIG. 3 is a circuit diagram of a contactless matrix switch (double-MOSFET two-way switch) of FIG. 2.

The forward matrix switch, backward matrix switch, and overcharge/overdischarge protection switch of the embodiment are all double-MOSFET two-way switches as shown in FIG. 3. The double-MOSFET two-way switch comprises a first MOSFET and a second MOSFET with the same performance parameters, in which the source electrode S1 of the first MOSFET is connected with the source electrode S2 of the second MOSFET. The gate electrode G1 of the first MOSFET is connected with the gate electrode G2 of the second MOSFET and used as a control side of the double-MOSFET two-way switch. The drain electrode D1 of the first MOSFET and the drain electrode D2 of the second MOSFET, respectively, are used as an input end and an output end of the double-MOSFET two-way switches.

Figure 4:
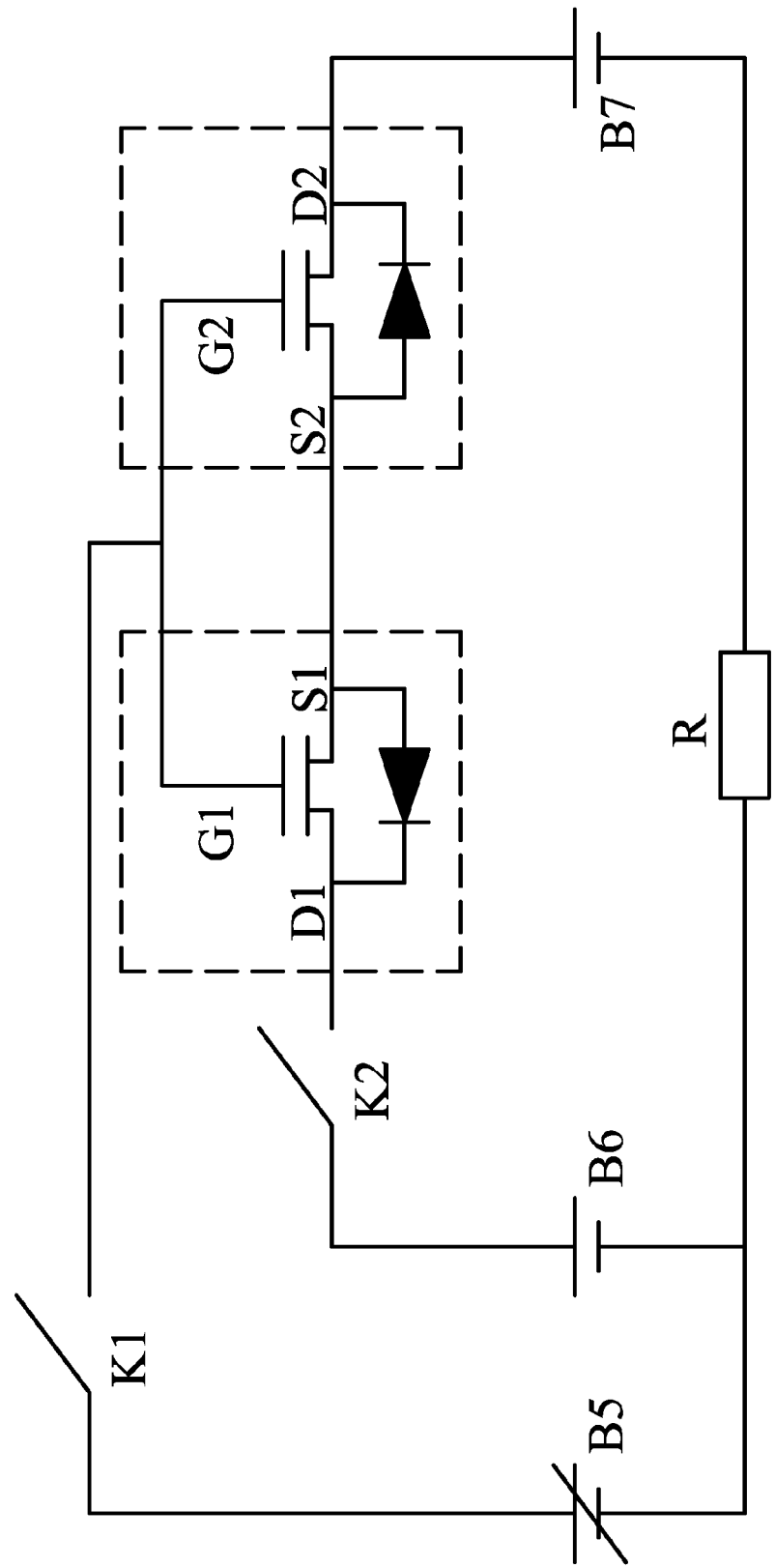
FIG. 4 is a functional diagram of the double-MOSFET two-way switch of FIG. 3.

As shown in FIG. 4, the double-MOSFET two-way switch functions as follows: when a drive voltage is applied to the control side, two MOSFETs become conductive simultaneously. Current flow direction varies with the voltage of the input end and the output end (i.e. D1 and D2) of the double-MOSFET two-way switch so as to achieve bidirectional conductivity. In other words, after K1 and K2 turn off, if the output voltage of the battery B6 is higher than that of the battery B7, the current will flow from D1 to D2 or vice versa.

The controller of the embodiment is arranged with a communication interface connecting thereto, through which users can easily and visibly monitor and record the working status of the lithium-ion battery pack and its lithium-ion cells.

Figure 5:
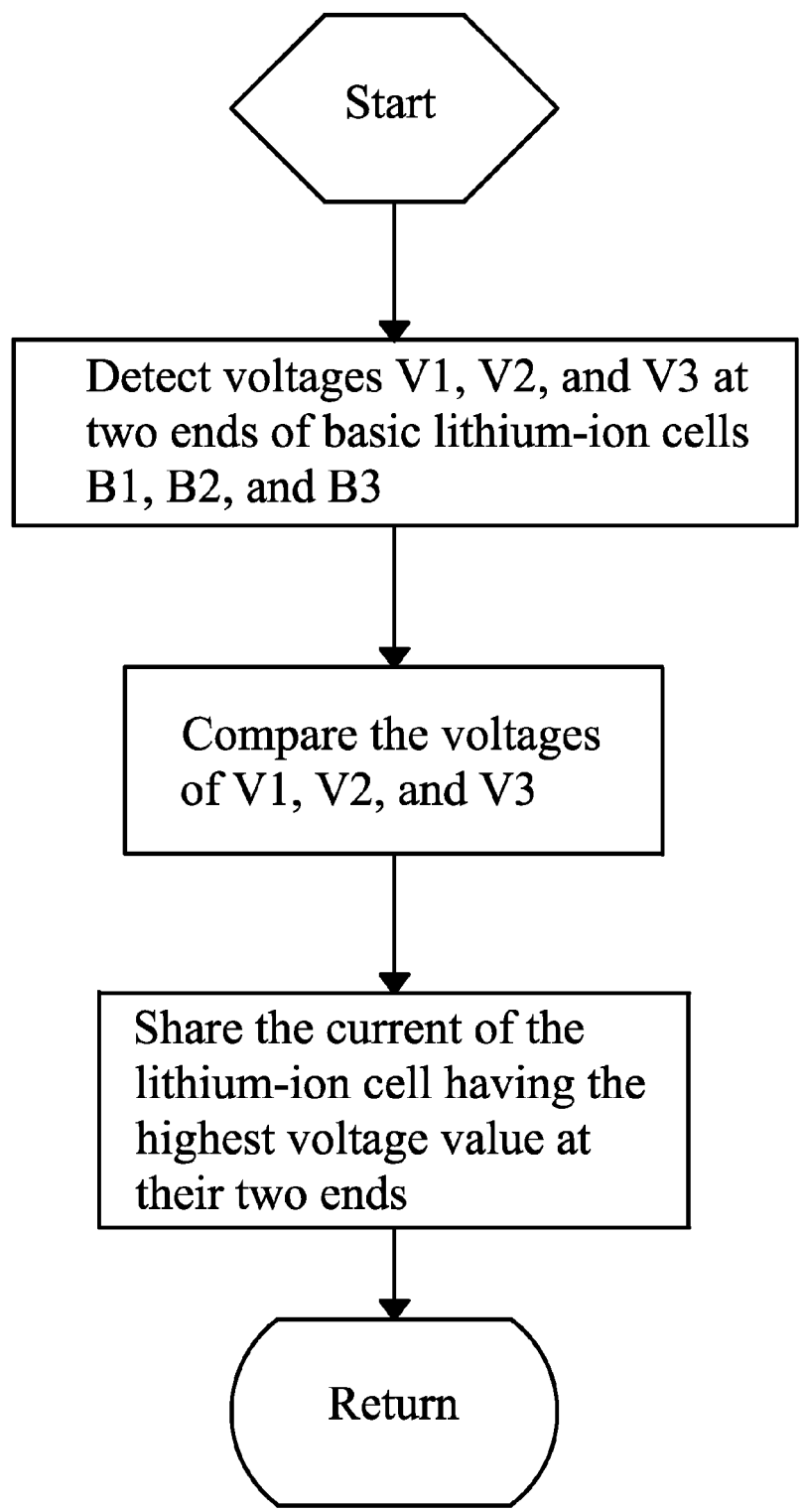
FIG. 5 is a charge equalizing flow chart for the basic unit of lithium-ion battery of FIG. 2.

The following is a detailed description of the charge/discharge equalizing procedures of the basic unit of lithium-ion battery:

As shown in FIG. 5, the charge equalizing procedure comprises the following steps:

1) The voltage detection module detects the voltages V1, V2, and V3 at two ends of the lithium-ion cells B1, B2, and B3 after being powered on and transmits the results to the controller;

2) The controller reads and compares the voltages V1, V2, and V3;

3) Share the current of the lithium-ion cell with the highest voltage at its two ends with the following steps:

Assume V3 is the highest voltage, the controller sends a control signal to the drive module, which drives the forward matrix switch and the backward matrix switch connected between the lithium-ion cell B3 and the lithium-ion cell for balance B4 to achieve bidirectional conductivity within a preset time t. The lithium-ion cell for balance B4 is connected in parallel to the lithium-ion cell B3 after conduction, i.e. the lithium-ion cell for balance B4 shares the current of the lithium-ion cell B3.

At this point, due to the equalizing effect of the lithium-ion cell for balance B4, the charging speed of the lithium-ion cell B3 becomes slower than that of the lithium-ion cells B1 and B2, which prevents the lithium-ion cell B3 from quickly reaching the threshold of the overcharge protection voltage and halting charging; after the preset time t, the controller sends the control signal again to the drive module to disconnect the forward matrix switch and the backward matrix switch and stop sharing the current of the lithium-ion cell B3. Thereafter, the above steps are all repeated.

To avoid overcharging the lithium-ion batteries, the charge equalizing method of the embodiment further comprises the following steps:

Determining whether the voltage of the lithium-ion cell with the highest voltage at its two ends is higher than the preset threshold of the overcharge protection voltage; if so, disconnecting the overcharge/overdischarge protection switch. This step can be followed after the detection of V1, V2, and V3 or carried out periodically.

Figures 6A, 6B:
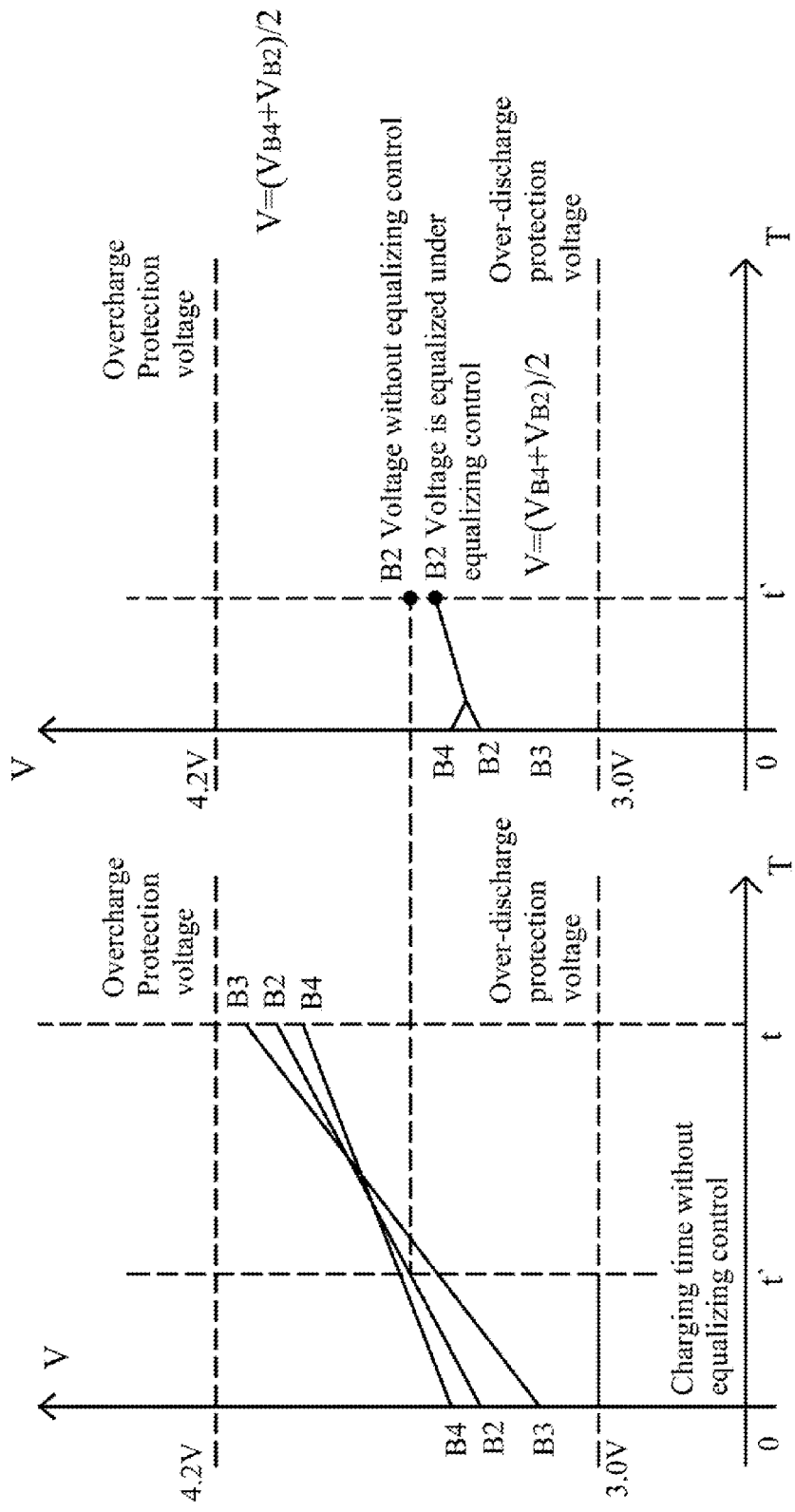
FIGS. 6A and 6B are comparison charts of the charge characteristics of the basic unit of lithium-ion battery of FIG. 2 with (FIG. 6B) and without (FIG. 6A) charge equalizing.

FIGS. 6A and 6B are comparison charts of the charge characteristics of the basic unit of lithium-ion battery with (FIG. 6B) and without (FIG. 6A) charge equalizing (to better depict the equalizing principle and equalizing effect, FIG. 6A shows only the voltage of the lithium-ion cell B4 and the lithium-ion cells B2 and B3).

In case there is no equalizing control, referring to FIG. 6A, when the lithium-ion cell B3 reaches the overcharge protection voltage at time t1, the overcharge/overdischarge protection switch disconnects to halt charging, during which time the lithium-ion cell B2 still cannot reach the nominal voltage and hence charging is incomplete. In case there is an equalizing control, referring to FIG. 6B, since the initial voltage of the lithium-ion cell B2 is higher than that of the lithium-ion cell B3, the lithium-ion cell for balance B4 conducts equalizing to the lithium-ion cell B2 and the resulting voltage at two ends of the lithium-ion cell B2 is $V=(V_{B4}+V_{B2})/2$. Because of the equalizing effect of the lithium-ion cell for balance B4, charging speed of the lithium-ion cell B2 becomes slower, after a while, the voltage at two ends of the lithium-ion cell B3 becomes greater than that of the lithium-ion cell B2, and then stop equalizing the lithium-ion cell B2 and restart a new equalizing process. In such real-time equalizing, the voltage of each lithium-ion cell tends to have a uniform voltage of reaching the threshold of the overcharge protection voltage. When the voltage of one lithium-ion cell reaches the threshold of the overcharge protection voltage, the other lithium-ion cells will be close to the nominal voltage.

Figure 7:
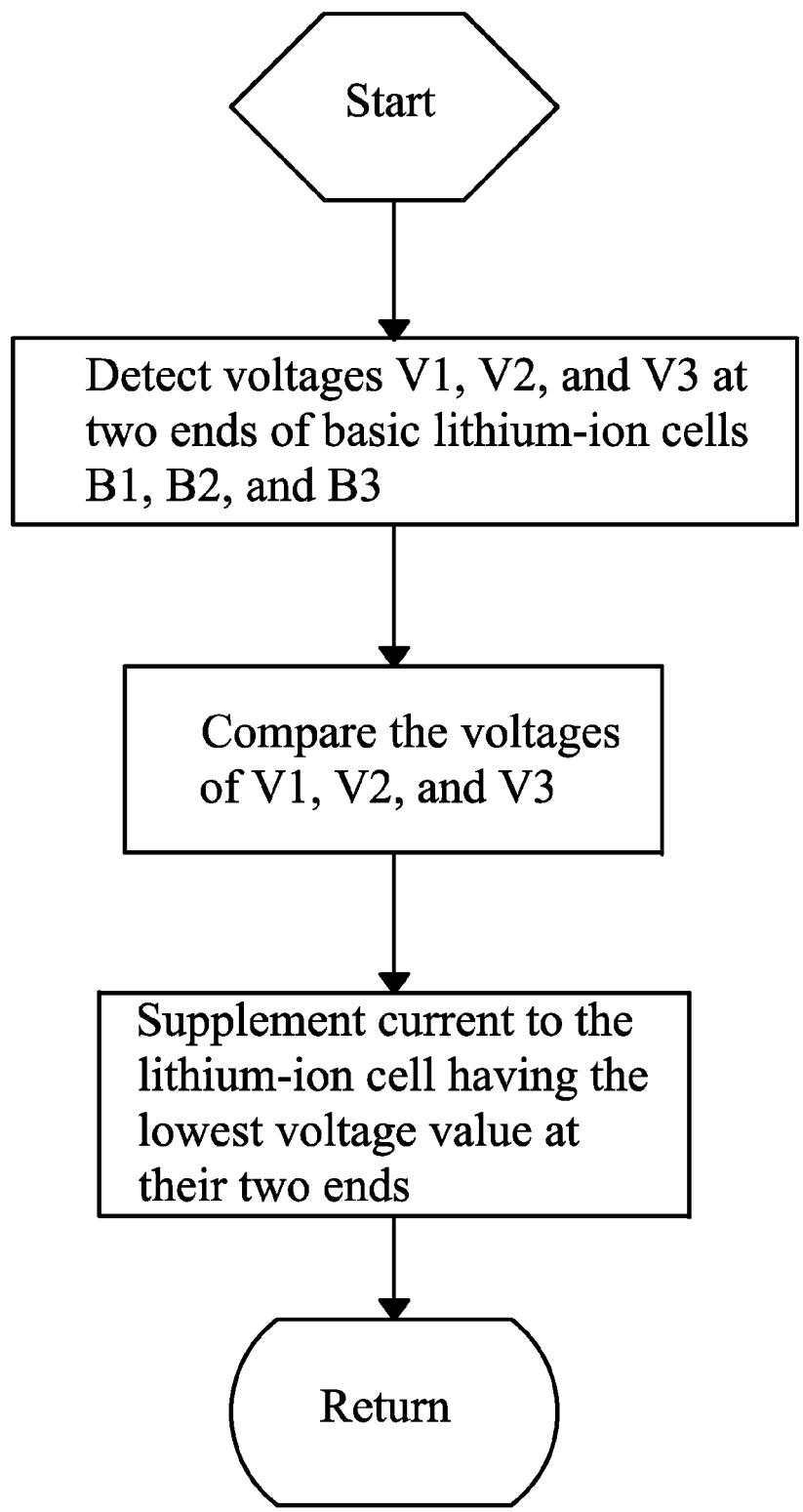
FIG. 7 is a discharge equalizing flow chart of the basic unit of lithium-ion battery of FIG. 2.

As shown in FIG. 7, the discharge equalizing procedure comprises the following steps:

1) The voltage detection module detects the voltages V1, V2, and V3 at two ends of the lithium-ion cells B1, B2, and B3 after connecting to a load and transmits the results to the controller;

2) The controller reads and compares the voltages V1, V2, and V3;

3) Supplementing current to the lithium-ion cell with the lowest voltage at its two ends with the following steps:

Assume V3 is the lowest voltage, the controller sends a control signal to the drive module, which drives the forward matrix switch and the backward matrix switch connected between the lithium-ion cell B3 and the lithium-ion cell for balance B4 to achieve bidirectional conductivity within a preset time t. The lithium-ion cell for balance B4 is connected in parallel to the lithium-ion cell B3 after conduction, i.e. the lithium-ion cell for balance B4 supplements current to the lithium-ion cell B3. At this point, due to the equalizing effect of the lithium-ion cell for balance B4, discharging speed of the lithium-ion cell B3 becomes slower than that of the lithium-ion cells B1 and B2, which prevents the lithium-ion cell B3 from quickly reaching the threshold of the overdischarge protection voltage and halting discharging. After the preset time t, the controller will send the control signal again to the drive module to disconnect the forward matrix switch and the backward matrix switch and stop equalizing the lithium-ion cell B3. Thereafter, the steps 1), 2) and 3) are repeated.

To prevent the lithium-ion batteries from overdischarging, the discharge equalizing method of the embodiment further comprises the following steps: determining whether the voltage of the lithium-ion cell with the lowest voltage at its two ends is lower than the preset threshold of the overcharge protection voltage, if so, disconnecting the overcharge/overdischarge protection switch. This step can be followed after detection of V1, V2, and V3 or carried out periodically.

Figures 8A, 8B:
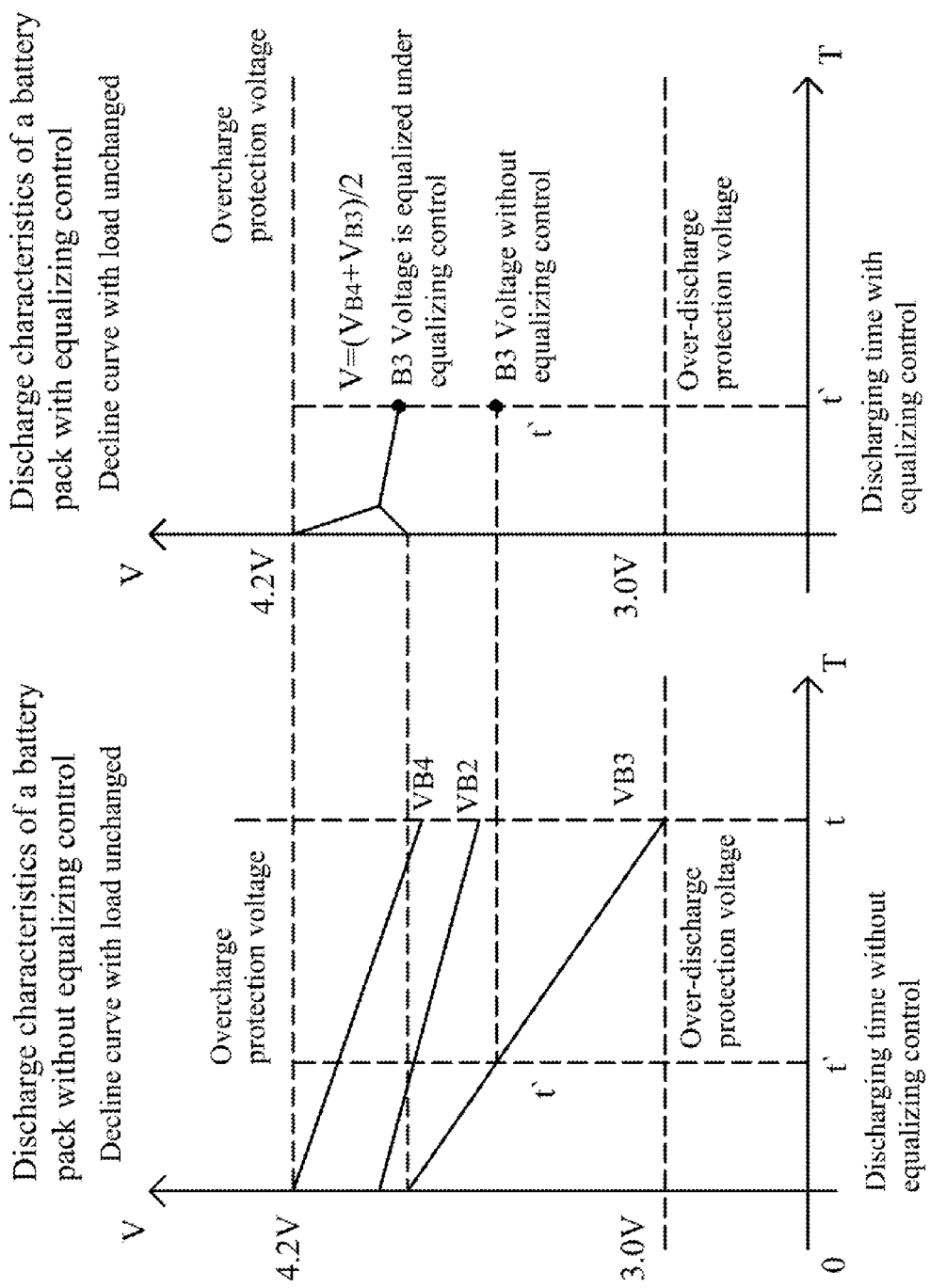
FIGS. 8A and 8B are of the discharge characteristics of the basic unit of lithium-ion battery of FIG. 2 with (FIG. 8B) and without (FIG. 8A) discharge equalizing.

FIGS. 8A and 8B are comparison charts of the discharge characteristics of the basic unit of lithium-ion battery with (FIG. 8B) and without (FIG. 8A) discharge equalizing (to better depict the equalizing principle and equalizing effect, FIG. 8 shows only the voltage of the lithium-ion cell for balance B4 and the lithium-ion cells B2 and B3).

In case there is no equalizing control, referring to FIG. 8A, when the lithium-ion cell B3 reaches the overcharge protection voltage, the overcharge/overdischarge protection switch will disconnect to halt discharging, during which time the lithium-ion cell B2 still possesses a large amount of electric energy not yet discharged and hence discharging is incomplete. In case there is an equalizing control, referring to FIG. 8B, since the initial voltage of the lithium-ion cell B2 is higher than that of the lithium-ion cell B3, the lithium-ion cell for balance B4 will conduct equalizing to the lithium-ion cell B3 and the resulting voltage at two ends of the lithium-ion cell B3 is $V=(V_{B4}+V_{B3})/2$. Because of the equalizing effect of the lithium-ion cell for balance B4, discharging speed of the lithium-ion cell B3 becomes slower, after a while, the voltage at two ends of the lithium-ion cell B2 becomes greater than that of the lithium-ion cell B3, and then stop equalizing the lithium-ion cell B3 and restart a new equalizing process. Under the effect of such real-time equalizing, the voltage of each lithium-ion cell tends to have a uniform voltage of reaching the threshold of the overdischarge protection voltage. When the voltage of one lithium-ion cell reaches the threshold of the overdischarge protection voltage, the other lithium-ion cells will reach the discharge protection threshold.

Tests have shown that when the limit of the overcharge voltage of the lithium-ion cells is 4.2 V and the limit of the overdischarge voltage is 3.0 V, the working voltage range of the lithium-ion cells of this embodiment can reach 3.10-4.15 V.

In practical applications, the number of series-connected lithium-ion cells of the basic unit of lithium-ion battery can be two or more. If this number is too small, the control costs of the battery pack will be too high. Even if the equalizing performance is high, the control performance of the pack still cannot be fully utilized. If this number is too large, the equalizing performance will decline. Tests have shown that the preferred number of the lithium-ion cells in series is three, four, or five, with a corresponding equalizing performance of 33%, 25%, and 20%, respectively.

Regarding the lithium-ion cell for balance, the same specifications and parameters as the lithium-ion cells are preferred.

In the basic unit of lithium-ion battery, two or more lithium-ion cells for balance can be configured in accordance with the number of the lithium-ion cells and actual needs and their connection principle is the same as in this embodiment.

Figure 9:
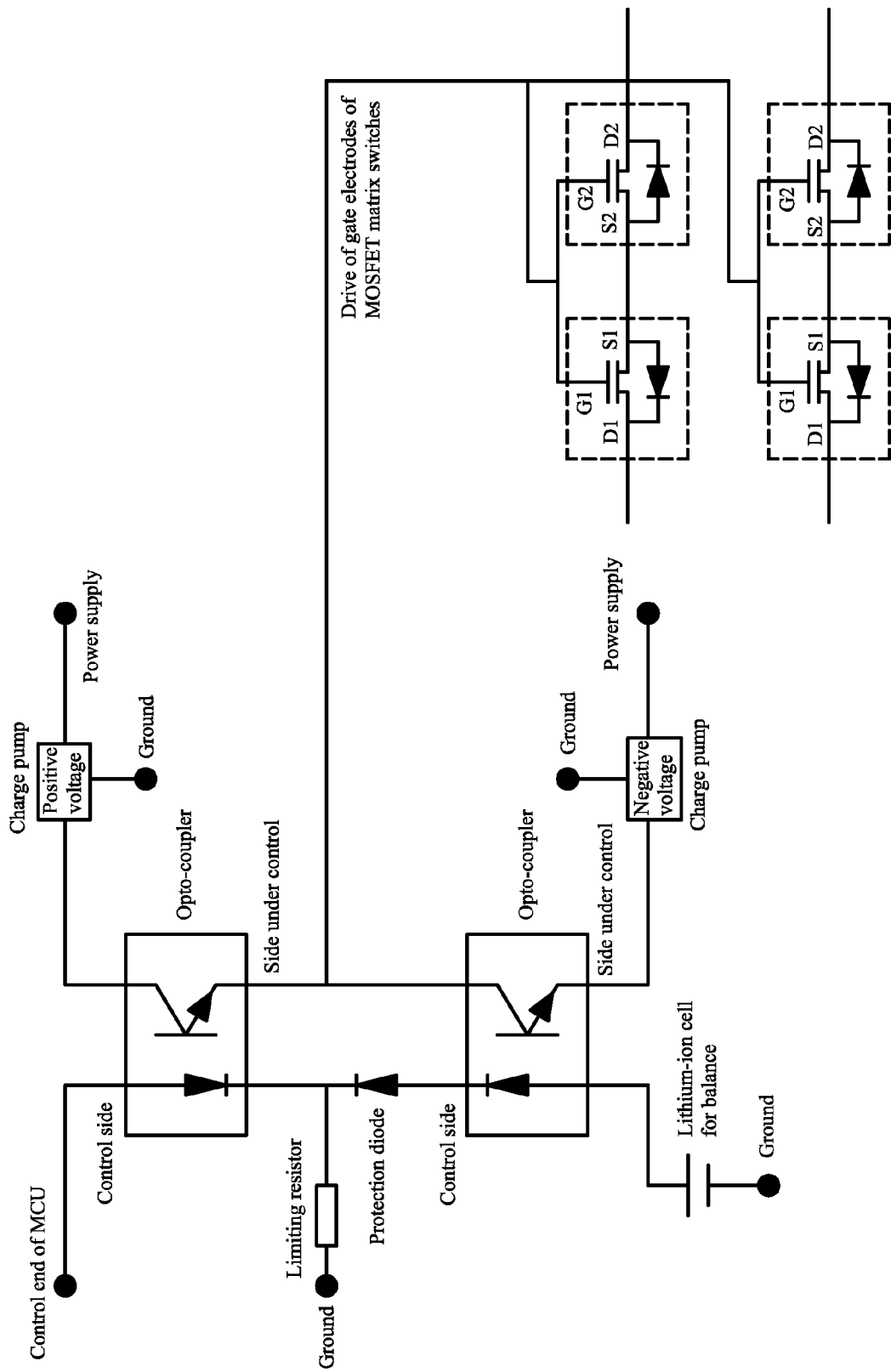
FIG. 9 is a circuit diagram of a drive module for a basic unit of lithium-ion battery according to one embodiment of the invention.

In embodiments of the invention, the drive module for the basic unit of lithium-ion battery is the core control circuit. As shown in FIG. 9, a drive circuit of the controllable MOSFET matrix switches comprises positive and negative two-way power supplies. The positive and negative power supplies connect with a gate electrode of the MOSFET matrix switches via an opto-coupler of their own; the controller turns the control side of the two opto-couplers on or off.

Voltages from the positive and negative two-way power supplies controlled by the two opto-couplers are combined and connected with the gate electrode of the MOSFET matrix switches. If a positive voltage is applied to the gate electrode of the MOSFET matrix switches, the resistance between a drain electrode and a source electrode of the MOSFET matrix switches is low and thus the MOSFET matrix switches turn on. If a negative voltage is applied, the resistance between the drain electrode and the source electrode of the MOSFET matrix switches is high and thus the MOSFET matrix switches turn off.

The quick on and off switching of the drive circuit is a precondition for the invention to employ the MOSFET matrix switches, which prevents such damages as system failure or short circuit caused by unexpected changes.

The drive circuit comprises a protection diode, and when the controller is being powered on or out of control or comprises floating input pins, the protection diode locks the opto-couplers to output a negative voltage, thereby ensuring that all the MOSFET matrix switches turn off to maintain circuit safety.

The protections of the drive circuit for the MOSFET matrix switches of the basic unit of lithium-ion battery comprise the power-on protection of the controller, the out of control protection of the control programs, and floating input pin protection of the out-of-control control side.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A basic unit of lithium-ion battery pack, comprising:
    a) at least two serially-connected lithium-ion cells;
    b) at least one lithium-ion cell for balance;
    c) controllable switches with the same number as the at least two serially-connected lithium-ion cells;
    d) a drive module for the controllable switches;
    e) a voltage detection module for detecting a voltage at two ends of each of the at least two serially-connected lithium-ion cells; and
    f) a controller;
    wherein the at least one lithium-ion cell for balance is configured to be selectively connected in parallel to one of the at least two serially-connected lithium-ion cells that has a highest voltage among the at least two serially-connected lithium-ion cells during a charging operation of the basic unit of lithium-ion battery pack;
    wherein the at least one lithium-ion cell for balance is configured to be selectively connected in parallel to one of the at least two serially-connected lithium-ion cells that has a lowest voltage among the at least two serially-connected lithium-ion cells during a discharging operation of the basic unit of lithium-ion battery pack;
    the controllable switches respectively control the turn on/off of the parallel connection between the at least one lithium-ion cell for balance and one of the at least two serially-connected lithium-ion cells independently at each time to conduct charging or discharging; and
    the drive module for the controllable switches and the voltage detection module are connected to the controller.

2. The basic unit of lithium-ion battery pack of claim 1, wherein the controllable switches are contactless matrix switches.

3. The basic unit of lithium-ion battery pack of claim 2, wherein each contactless matrix switches comprises a forward matrix switch connected between the anode of the one of the at least two serially-connected lithium-ion cells and the anode of the at least one lithium-ion cell for balance and a backward matrix switch connected between the cathode of the one of the at least two serially-connected lithium-ion cells and the cathode of the at least one lithium-ion cell for balance.

4. The basic unit of lithium-ion battery pack of claim 1, wherein
    both the forward and the backward matrix switches are two-way switches with double metallic oxide semiconductor field effect transistors (MOSFETs);
    each double-MOSFET two-way switch comprises a first MOSFET and a second MOSFET;
    a source electrode of the first MOSFET is connected to that of the second MOSFET;
    a gate electrode of the first MOSFET is connected to that of the second MOSFET and used as a control side to connect the drive module; and
    drain electrodes of the first MOSFET and the second MOSFET are used as input and output ends, respectively, for the double-MOSFET two-way switch.

5. The basic unit of lithium-ion battery pack of claim 4, wherein the number of the at least two serially-connected lithium-ion cells in series is three, four, or five.

6. The basic unit of lithium-ion battery pack of claim 5, further comprising an overcharge and overdischarge protection switch connected in series to the at least two serially-connected lithium-ion cells, and a control side of the overcharge and overdischarge protection switch is connected to the drive module.

7. The basic unit of lithium-ion battery pack of claim 1, further comprising an overcharge and overdischarge protection switch connected to the at least two serially-connected lithium-ion cells, and a control side of the overcharge and overdischarge protection switch is connected to the drive module.

8. The basic unit of lithium-ion battery pack of claim 1, further comprising a self-recovery fuse for secondary protection connected in series to the at least two serially-connected lithium-ion cells.

9. The basic unit of lithium-ion battery pack of claim 1, wherein
    the controllable switches are MOSFET matrix switches;
    a drive circuit of the controllable MOSFET matrix switches comprises positive and negative two-way power supplies;
    the positive and negative power supplies connect, respectively, with a gate electrode of the MOSFET matrix switches via an opto-coupler of their own; the controller turns a control side of the two opto-couplers on or off;
    voltages from the positive and negative two-way power supplies controlled by the two opto-couplers are combined and connected with the gate electrode of the MOSFET matrix switches; if a positive voltage is applied to the gate electrode of the MOSFET matrix switches, the resistance between a drain electrode and a source electrode of the MOSFET matrix switches is low and thus the MOSFET matrix switches turn on; if a negative voltage is applied to the gate electrode of the MOSFET matrix switches, the resistance between the drain electrode and the source electrode of the MOSFET matrix switches is high and thus the MOSFET matrix switches turn off;
    the drive circuit comprises a protection diode, and when the controller is being powered on, out of control, or comprises floating input pins, the protection diode locks the opto-couplers to output a negative voltage, thereby ensuring that all the MOSFET matrix switches turn off to maintain circuit safety; and
    the protections of the drive circuit for the MOSFET matrix switches of the basic unit of lithium-ion battery comprise the power-on protection of the controller, the out of control protection of the control programs, and floating input pin protection of the out-of-control control side.

10. A battery pack comprising a plurality of basic units of lithium-ion battery pack of claim 1, the basic units of lithium-ion battery pack being connected with each other in series, in parallel, or a combination thereof.

* * * * *